United States Patent [19]
Flotow et al.

[11] Patent Number: 5,358,085
[45] Date of Patent: Oct. 25, 1994

[54] CLUTCH PLATE ANTI-RATTLE AND SEPARATOR DEVICE

[75] Inventors: Richard A. Flotow, Butler; Daniel V. Gochenour, Churubusco, both of Ind.

[73] Assignee: Dana Corporation, Toledo, Ohio

[21] Appl. No.: 796,994

[22] Filed: Nov. 19, 1991

[51] Int. Cl.$^5$ .............................. F16D 13/75
[52] U.S. Cl. ........................ 192/70.25; 192/30 V; 192/111 A
[58] Field of Search ............. 192/30 V, 70.25, 70.28, 192/70.19, 111 A; 188/73.38, 73.36

[56] References Cited

U.S. PATENT DOCUMENTS

| | | | |
|---|---|---|---|
| 2,600,520 | 6/1952 | Spase | 192/70.28 X |
| 3,424,288 | 1/1969 | Sink | 192/70.16 |
| 3,548,984 | 12/1970 | Root | 192/70.17 |
| 3,561,577 | 2/1971 | Binder | 192/70.28 X |
| 3,642,101 | 2/1972 | Hauth | 192/70.17 X |
| 3,754,624 | 8/1973 | Eldred | 188/73.38 X |
| 4,392,561 | 7/1983 | Watanabe | 188/73.36 |
| 4,478,324 | 10/1984 | Sink | 192/70.17 |
| 4,479,569 | 10/1984 | Kummer et al. | 192/70.2 |
| 4,534,457 | 8/1985 | Eltze et al. | 192/30 V X |
| 4,673,065 | 6/1987 | Gerard et al. | 188/73.38 |
| 4,715,484 | 12/1987 | Flotow | 192/70.25 |
| 4,940,124 | 7/1990 | Galuska et al. | 192/70.28 |
| 4,941,557 | 7/1990 | Flotow et al. | 192/70.25 |
| 5,018,613 | 5/1991 | Nagano | 192/70.25 |
| 5,069,314 | 12/1991 | Madzgalla et al. | 188/73.38 X |

Primary Examiner—Rodney H. Bonck
Attorney, Agent, or Firm—F. B. McDonald

[57] ABSTRACT

An anti-rattle device for a multiple disc friction clutch assembly also doubles as a clutch disc separator device. In a preferred form, the device is formed of spring steel, and is adapted to be received on a radially extending lug of a clutch plate. The device has an elongate body adapted to extend generally tangentially to the circumference of the clutch plate. The device includes a lug-receiving slot in one of two elongate boundary edges, and is adapted to be trapped between the circumferential contours of a clutch cover bracket and the clutch plate. The device is installed on the lug without special tools, and is retained on the lug solely by friction. This permits the device to slide axially on the lug under forces imposed by the flywheel as the linings of the friction discs wear, thereby permitting the device to reposition itself and to thus continue to be maximally effective for assuring axial separation of the friction discs during clutch disengagement over the entire useful life of the friction discs.

8 Claims, 2 Drawing Sheets

CLUTCH PLATE ANTI-RATTLE AND SEPARATOR DEVICE

BACKGROUND OF THE INVENTION

This invention relates to multiple friction disc assemblies such as intermediate plate clutches employed in heavy trucks. More particularly, the invention relates to anti-rattle and separator devices for clutch plates.

Numerous devices have been used to provide anti-rattle features for clutch plates employed in heavy duty clutches. Many other, separate, devices have been used to maintain separation of clutch plates from friction discs in such clutches during periods of clutch disengagement. Typically, an intermediate clutch plate is positioned between a pair of friction discs, which in turn are sandwiched between a flywheel and a pressure plate. A clutch cover is secured rigidly to the flywheel by brackets which include slots. The clutch plate generally includes lugs which extend radially for establishing driving registration with the slots within the brackets; and, whether or not the clutch is engaged, the clutch plate rotates at all times while the engine of the vehicle is running. Such plates are heavy and tend to clunk or "rattle" about while the clutch is disengaged, i.e. whenever there are no loads imposed on the rotating plate. Anti-rattle devices have included springs of either coiled or flat spring steel, radially positioned between cover and plate members to absorb or dampen torsional and tumbling energy components of the plate.

Separator devices, on the other hand, are typically actuated by axially loaded springs (as opposed to radial springs normally employed for anti-rattle functions). Separator devices are utilized to assure that the clutch plate will remain spaced away from the discs during periods of disengagement to avoid "bumping" contacts between disc and plate members, and thus to avoid wear problems which tend to result. Although there have been numerous separate attempts to improve anti-rattle and separator functions within heavy duty clutches, this inventor is unaware of any single or unitary devices which combine anti-rattle and separator functions.

SUMMARY OF THE INVENTION

A unitary article of manufacture provides both anti-rattle and separator functions when mounted solely by frictional means on a clutch plate lug. In one preferred form, the device is a generally planar, elongate, unitary spring steel member adapted to extend generally tangentially to the circumference of a clutch plate. The member is frictionally retained within the circumferential clearance between the clutch cover and plate, while supported without separate mechanical fasteners on the clutch plate lug. The elongate body of the member includes a lug receiving slot in one medial side thereof which comprises edges extending perpendicularly to a major axis of the body. The edges are greater in length than the sides of the lug, and thus the device is adapted to be automatically adjusted, or moved axially along the lug, during wear of the clutch friction discs. An elongate boundary edge positioned medially opposite the slot provides a linear edge adapted for engagement with the flywheel, wherein the flywheel is effective to automatically position the device with respect to the lug as the friction discs wear. Thus, the device will be shifted axially along its minor axis to new positions on the lug by virtue of flywheel pressure against its linear edge.

To the extent that the device is positioned under spring tension between clutch cover and clutch plate, the device will also operate to maintain axial separation of a clutch plate from a pair of friction discs upon disengagement of the clutch; thus the same device is adapted to function as a clutch plate separator. The term "separator" as used in this context is a term of art which refers to "anti-rattle" or "non-vibratory" phenomena. This invention is directed to restriction of the clutch plate against vibratory or rattling motion while the clutch is disengaged. In this sense, the clutch plate and discs are said to be "separated".

Finally, the device is easily and simply manufactured, as well as installed without requirement of nuts, bolts, or other connectors to the extent that it is retained on the lug solely by friction.

DETAILED DESCRIPTION OF A PREFERRED EMBODIMENT

Figures 1, 2:
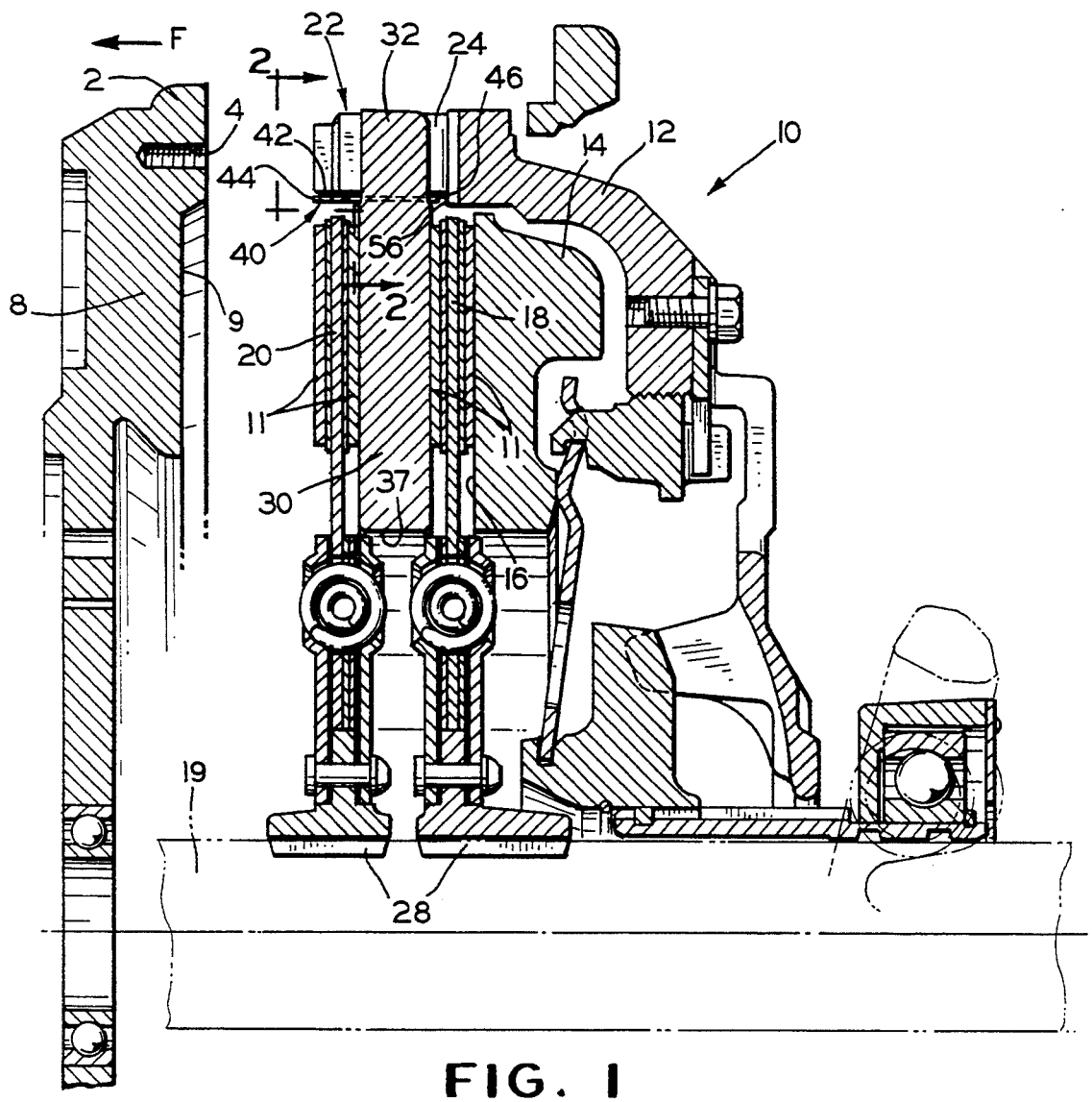
FIG. 1 is a fragmentary, partially exploded, view of a clutch assembly which incorporates a preferred embodiment of the present invention.
FIG. 2 is a view along lines 2—2 of FIG. 1.

Referring initially to FIGS. 1 and 2, a clutch assembly 10 incorporates a preferred embodiment of the present invention. The assembly 10 includes a clutch cover 12 affixed to a flywheel 8 (shown exploded away from the clutch assembly 10 in direction indicated by arrow "F"). The cover is normally secured to a flywheel ring 2 by bolts (not shown) which pass through apertures 4 and 6 in respective cover and flywheel members. The flywheel 8 is coupled to an engine (not shown) which supplies rotary torque thereto. A spring-loaded pressure plate 14 has a face 16 normally biased against a pair of friction driven discs 18 and 20 which, in turn, are coupled by splines 28 to a driven shaft 19. Intermediately positioned between the driven discs 18 and 20 is an annular "intermediate" clutch plate 30. Hence the plate 30 is a drive member, as are the pressure plate 14 and the flywheel 8, which members all rotate with the engine in a direction "R". To the extent that the friction discs 18 and 20 are normally biased between and among the latter members, the friction discs 18 and 20 also rotate whenever the clutch is engaged, thereby driving the driven shaft 19.

Figure 5:
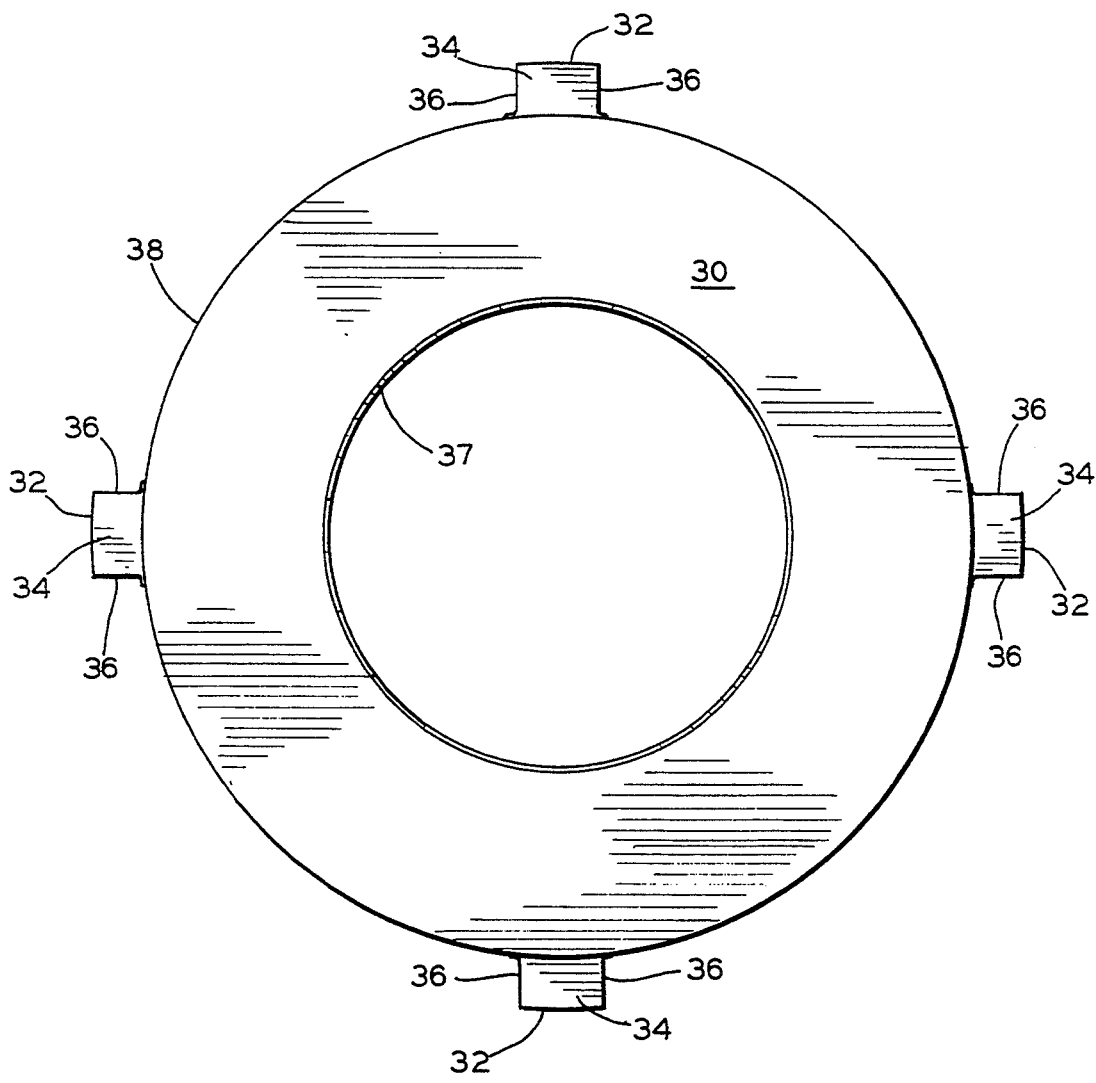
FIG. 5 is a face view of a clutch plate which includes lugs adapted to accommodate the device of FIGS. 3 and 4.

Referring now also to FIG. 5, a plurality of radially extending lugs 32 are affixed to the clutch plate 30, and are interdigitally received within radially oriented slots 24 of a like plurality of axially extending cover brackets 22 (only one bracket and one slot being shown in FIGS. 1 and 2). Thus it will apparent to those skilled in the art that lug drive surfaces 36 of the plate 30 are drivingly engaged by bracket slots sides 26 (FIGS. 2). The intermediate plate 30 defines an inner circumferential surface 37 (FIG. 5), as well as an outer circumferential surface 38. The plate is driven by the lugs 32 which are rigidly affixed to and symmetrically positioned about the outer circumferential surface 38 of the clutch plate. To the extent that the inner circumferential surface 37 of the clutch plate 30 is not supported, it will be apparent that even when tolerances between lugs and slots are small, tumbling and torsional energies carried by the rotating plate will cause the plate to clunk and vibrate, or "rattle" within the slots 24 of the cover brackets 22.

Figure 3:
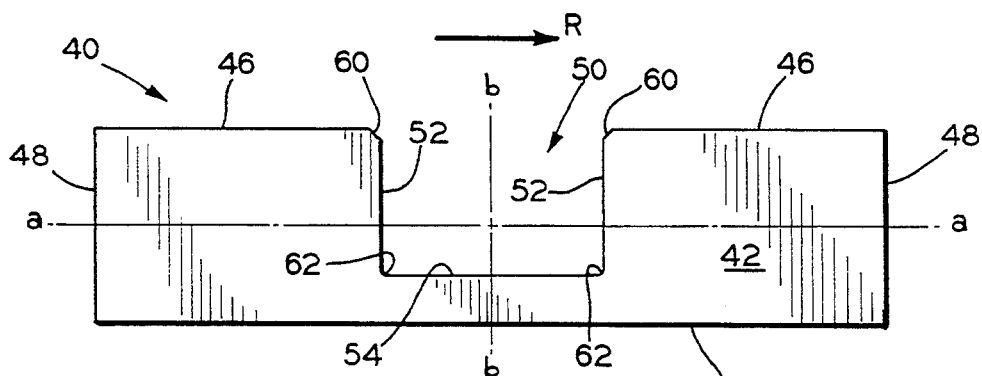
FIG. 3 is a plan or face view of the clutch plate anti-rattle and separator device of the present invention.
Figure 4:
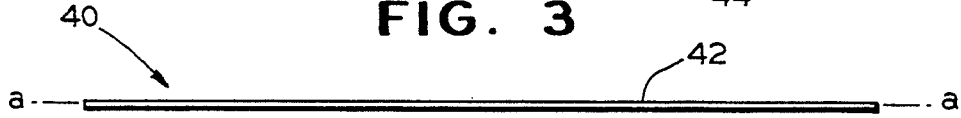
FIG. 4 is a profile or side elevation of the device shown in FIG. 3.

Referring now to FIGS. 3 and 4, a preferred embodiment of an anti-rattle and positioning device 40, formed of a resilient material such as spring steel, provides a solution to the tumbling and torsional energies which would otherwise cause undesirable noise and vibration within the clutch assembly 10. The device 40 is preferably formed as an elongated thin flat strip of spring steel (FIG. 4) and is situated (FIG. 2) so as to be trapped about the lug 32 between the cover bracket 22 and the outer circumferential surface 38 of the clutch plate 30. The curvature of the members 22 and 30 will be effective to hold the device in an elastically distorted curvilinear form. The resultant radially directed spring tension of the device 40 will provide the anti-rattle feature described. Shown in its unrestrained form in FIGS. 3 and 4, the device 40 has a top surface 42, is generally a U-shaped member as shown in its face view (FIG. 3), and incorporates a lug slot 50 adapted to accommodate one lug 32 of the plate 30. The slot 50 defines a pair of interior lug drive edges 52 parallel to ends 48 of the device. Ends 48 and edges 52 lie parallel to the minor axis "b—b" while longitudinal or elongate sides 44 and 46 are parallel to the major axis "a—a" as shown The bottom edge 54 of the lug slot 50 is also parallel to the major axis, and provides a limit or stop to the amount of axial automatic adjustment of the device on a given lug. In a preferred embodiment, the slot drive edges 52 incorporate chamfered spaced boundary edges 60 (FIG. 3) to facilitate assembly, while the interior corners 62 thereof are radiused for ease of manufacture. Finally, the direction of rotation of the clutch discs and plate as indicated by arrows "R" is in a direction parallel to the major axis "a—a" of the device 40.

Utilization of the device 40 may now be described. Upon assembly of a clutch 10 which incorporates the described preferred embodiment of the anti-rattle and positioning device 40 of the present invention, the device is installed preferably over each lug 32 in a manner such that the bottom edge 54 of the lug slot 50 is parallel to a lug face 34. The device will be oriented in a manner such that its major axis "a—a" is generally tangent to a point on the circumference of the plate 30 from which the lug extends. The lug slot 50 of the device is sized to frictionally engage the drive surfaces 36 of the lugs, and as a practical matter, the device must be bent slightly to fit into the curved spacing 33 (FIG. 2) between the clutch cover bracket 22 and clutch plate 30 (FIG. 2). The slot length or opening, as measured along the axis "a—a", will fall preferably within a range of 15–35% of the length of the device 40. Upon initial installation, the bottom edge 54 of the lug slot will not physically contact its associated lug face 34, but will be spaced by an amount equal to or greater than approximately one-half of the anticipated wear travel of the clutch friction linings 11 of the pair of associated friction discs 18 and 20. Those skilled in the art, will appreciate that the initial spacing between the edge 54 and face 34 will equal approximately 150 thousandths to 200 thousandths of an inch.

As the clutch facings wear, the longitudinal boundary or side 44 of the device 40 will be pressed axially toward the lug 32 via the flywheel during cycles of clutch engagement. Over the useful life of the clutch linings 11, the pressure plate 14 and the flywheel face 9 will move closer together upon clutch engagement due to wear of the linings, and the lug 32 will move deeper into the slot 50.

The length of edges 52 must be longer than the lug sides 36 for purposes of accommodating sliding frictional movement of the device along the sides 36. However, in order to avoid binding or distortion of the device 40, the device should be sized so that the spaced, elongate boundaries 46 never contact the interior clutch cover surface 56 (FIG. 1). The surface 56 should thus remain spaced from the edges 46 of the device 40 even in a fully worn clutch lining condition. In the preferred form, the clearance between the slot drive edges 52 and lug sides 36 should be no more than plus or minus two thousandths of an inch to assure requisite frictional engagement. The device 40 is thus designed to be in relatively tight frictional engagement with the lug sides 36. Thus, unlike the high friction movement between the drive plate lug 32 and the device 40, this invention contemplates a relatively easy sliding of the device 40 with respect to the bracket 22. Movement of the drive plate with respect to the bracket, although frictionally dampened, is thus not axially restricted.

Finally, those skilled in the art will also appreciate the spring tension of the device against the outer circumferential surface 38 of the clutch plate 30 will be effective to provide a clutch plate separator function. Thus the device will be effective to frictionally resist axial movement of the clutch plate 30 toward the discs 18 and 20 during clutch disengagement, thus avoiding torsionally induced "bumping" of the plate against the discs, and consequent wear of the friction linings 11.

Although only one embodiment has been detailed and described herein, the claims are directed to numerous additional embodiments which may fall within their spirit and scope.

What is claimed is:

1. In a multiple disc friction clutch assembly including drive and driven means, said drive means comprising a flywheel, a cover, and a plurality of axially extending circumferentially spaced brackets securing said cover to said flywheel, said drive means comprising a driven shaft and a pair of friction discs axially but non-rotatably moveable on said shaft for transmission of rotary motion to said shaft, said drive means further comprising an axially floating annular drive plate positioned intermediately of said friction discs for selective frictional driving engagement with said discs, said drive plate including a plurality of radially outwardly extending lugs, each lug comprising axially oriented sides, wherein each bracket comprises a slot, wherein each lug is adapted to interdigital registration with one slot of one bracket, and wherein an anti-rattle device is attached to at least one of said lugs for dampening torsional and tumbling energy components of said plate; an improvement wherein said device comprises means for automatically shifting axial positions on said lug as result of axial movement of said lug with respect to said flywheel as said friction discs wear, wherein said device comprises means for maintaining axial separation of said discs during disengagement of said clutch during rotation of said clutch, and wherein said anti-rattle device is retained on said lug by frictional forces only, wherein said device further comprises a thin, generally planar elongate body which defines a major axis adapted to extend generally tangentially to a point on the circumference of said plate, wherein means for retaining said device on said lug comprises a lug-receiving slot extending from one of two elongate boundary edges of said planar body, said body defining a minor axis orthogonal to said major axis, said lug-receiving slot comprising a pair of lug drive edges extending parallel to said minor axis, said edges spaced apart and sized to frictionally engage axially extending sides of said lug, wherein said lug drive edges of said device are greater in length than said sides of said lug, whereby said device is adapted for change of position axially on said lug during wear of said friction discs, and wherein means for said change of position comprises one of said elongate boundary edges, whereby as said friction discs wear, said one elongate boundary edge is adapted for being urged toward said lug by said flywheel.

2. The apparatus of claim 1 wherein in its free, unrestrained state, prior to installation, said elongate device lies within a single plane, whereas upon installation, the device becomes elastically distorted under spring tension imposed thereon by one bracket and said drive plate.

3. The apparatus of claim 2 wherein said cover comprises said plurality of brackets, each bracket comprising an inner circumferential surface, and wherein said device comprises a top surface which bears radially against said inner circumferential surface of one of said brackets to absorb radial float of said drive plate, wherein said distortion of said device is generally curvilinear.

4. The apparatus of claim 3 wherein said device resists axial movement of said drive plate upon clutch disengagement via frictional forces imposed on said device by said lug and said inner circumferential surface of said bracket, whereby said drive plate is adapted to be retained spaced apart from said friction discs during clutch disengagement.

5. The apparatus of claim 4 wherein said lug-receiving slot comprises an opening equal to 15–35% of the length of said device as measured along said major axis.

6. The apparatus of claim 5 wherein said lug-receiving slot comprises three contiguous edges comprising two parallel lug drive edges and one slot bottom edge orthogonal to said drive edges.

7. The apparatus of claim 6 wherein said clutch plate comprises four radially extending lugs, each lug circumferentially spaced symmetrically about the circumference of said plate, each lug positioned 90 degrees apart from the next adjacent lug.

8. An article of manufacture comprising a clutch plate anti-rattle and separator device formed of spring steel adapted to be frictionally installed on a lug of a drive plate, such that apart from frictional means said device is mechanically unrestrained against automatic axial movement with respect to said lug, wherein said movement may be induced by means external to said device, wherein said device further comprises a generally flat, thin, elongate U-shaped body having a longitudinal axis adapted to extend generally tangentially to the circumference of said drive plate, said body defining a lateral axis which defines the symmetrical center of the body, said lateral axis adapted to extend generally parallel to the rotational axis of said drive plate, said body comprising an opening formed in an elongate edge thereof parallel to said longitudinal axis, said opening defining a slot sized to engage said lug in a frictional press-fit relationship, whereby said body is adapted to be shifted along said lateral axis to new positions on said lug by said means external to said body.

* * * * *